US010735937B2

(12) United States Patent
Shiihara

(10) Patent No.: US 10,735,937 B2
(45) Date of Patent: Aug. 4, 2020

(54) MANAGEMENT APPARATUS, MOBILE TERMINAL, AND METHODS THEREOF

(71) Applicant: CANON KABUSHIKI KAISHA, Tokyo (JP)

(72) Inventor: Takeshi Shiihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/891,186

(22) Filed: Feb. 7, 2018

(65) Prior Publication Data

US 2018/0234828 A1 Aug. 16, 2018

(30) Foreign Application Priority Data

Feb. 16, 2017 (JP) ................................ 2017-027292

(51) Int. Cl.
*H04W 8/00* (2009.01)
*H04W 8/26* (2009.01)
*H04W 84/18* (2009.01)

(52) U.S. Cl.
CPC .......... *H04W 8/005* (2013.01); *H04W 8/265* (2013.01); *H04W 84/18* (2013.01)

(58) Field of Classification Search
CPC ................................ H04W 4/80; H04W 8/005
See application file for complete search history.

(56) References Cited

U.S. PATENT DOCUMENTS

| | | | | |
|---|---|---|---|---|
| 2012/0136461 | A1* | 5/2012 | Satoh | H04Q 9/00 700/19 |
| 2017/0127264 | A1* | 5/2017 | Yang | H04W 8/205 |
| 2017/0192409 | A1* | 7/2017 | Kim | G05B 19/042 |
| 2018/0077783 | A1* | 3/2018 | Sooch | H05B 33/0863 |
| 2018/0167228 | A1* | 6/2018 | Elcock | H04L 12/2823 |
| 2019/0306024 | A1* | 10/2019 | Petria | H04L 12/66 |

FOREIGN PATENT DOCUMENTS

JP 2001175128 A 6/2001

* cited by examiner

*Primary Examiner* — Ernest G Tacsik
(74) *Attorney, Agent, or Firm* — Canon U.S.A., Inc. IP Division

(57) ABSTRACT

A management apparatus according to the present invention performs a search of a mesh network for a network device, obtains operation information from the network device found by the search via the mesh network, and further transmits the obtained operation information to a device management system via a mobile network.

11 Claims, 12 Drawing Sheets

MANAGEMENT APPARATUS, MOBILE TERMINAL, AND METHODS THEREOF

BACKGROUND

Field of the Disclosure

The present disclosure relates to a technique for collecting information about network devices by using wireless communication.

Description of the Related Art

For conclusion of a contract with a customer, a network device management company which sells, leases, and does maintenance may want to obtain operation information in an office environment in which a plurality of network devices is in operation. Examples of the operation information include operation logs of the network devices, consumable usages, and power consumption.

Japanese Patent Application Laid-Open No. 2001-175128 discusses a mechanism in which a management apparatus dedicated to a network in a customer environment is installed and connected to the network, and the management system collects operation information from network devices on the network and transmits the operation information to an external management system via the Internet.

The foregoing mechanism is predicated on that network settings unique to the customer environment are made on the management apparatus, and that a network policy of the customer environment is modified as well. For example, the management apparatus may obtain operation information about network devices by a method using a common management protocol of the network devices, such as Simple Network Management Protocol (SNMP) and Business Machine Linkage Service (BMLinkS). Network communication settings in an office environment are usually operated and managed in the form of a white list. A router device constituting a customer network therefore needs to be set to permit the protocol(s) needed for the acquisition of the operation information described above. If a private network in the customer environment is a Transmission Control Protocol/Internet Protocol (TCP/IP) network, permission settings of communication ports to be used by the protocols are also needed in addition to those of the protocols. Such settings need to be applied to the entire customer environment network in which the network devices to be managed exist, before the management apparatus starts to manage the network devices.

Moreover, when the management apparatus is removed, an operation for restoring the settings of the customer network to an original state is also needed. Operations on the network-related devices on the customer side are therefore inevitable.

Under the circumstances, a mechanism for easily introducing a management apparatus for collecting data such as operation information from network devices installed in the environment of a customer's existing network without a change to the network is demanded.

SUMMARY

According to an aspect of the present disclosure, a management apparatus includes a memory storing instructions, and a processor which is capable of executing the instructions causing the management apparatus to join a mesh network identified by identification information specified in advance by using a wireless communication function, perform a search of the mesh network for a network device, obtain operation information from the network device found by the search via the mesh network, and transmit the obtained operation information to a device management system via a mobile network implemented by a card containing identification information for using the mobile network.

Further features of the present disclosure will become apparent from the following description of exemplary embodiments with reference to the attached drawings.

DESCRIPTION OF THE EMBODIMENTS

A best mode for carrying out the present disclosure will be described with reference to the drawings.

A first exemplary embodiment of a network system including a management system for managing network devices according to the present disclosure will be described. In the present exemplary embodiment, a description will be given by using image processing apparatuses, including a printer, a multifunction peripheral (MFP), and a copying machine having multiple functions, as examples of the network devices. However, aside from the image processing apparatuses, the network devices for an Internet-based or other remote management system to collect operation information from and support operation of may include a network camera, a three-dimensional (3D) printer, a digital medical instrument, and home appliance products. The present exemplary embodiment is also applicable to such devices.

As a precondition, the target network devices of the management system according to the present exemplary embodiment are configured so that hardware and software for wireless communication capable of joining a wireless personal area network (WPAN), such as a mesh network to be described below, are built in or can be added to the target network devices.

<System Configuration>

Figure 1A:
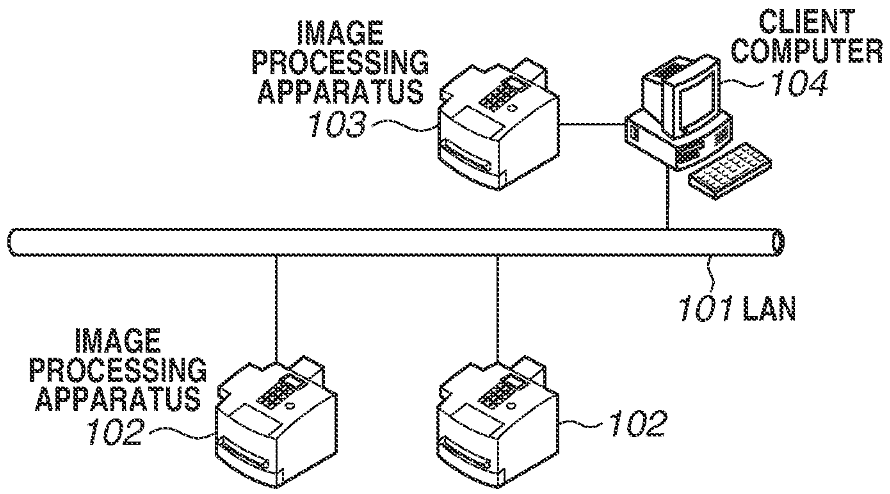
FIGS. 1A and 1B are diagrams illustrating an example of a system configuration according to one or more aspects of the present disclosure.
Figure 1B:
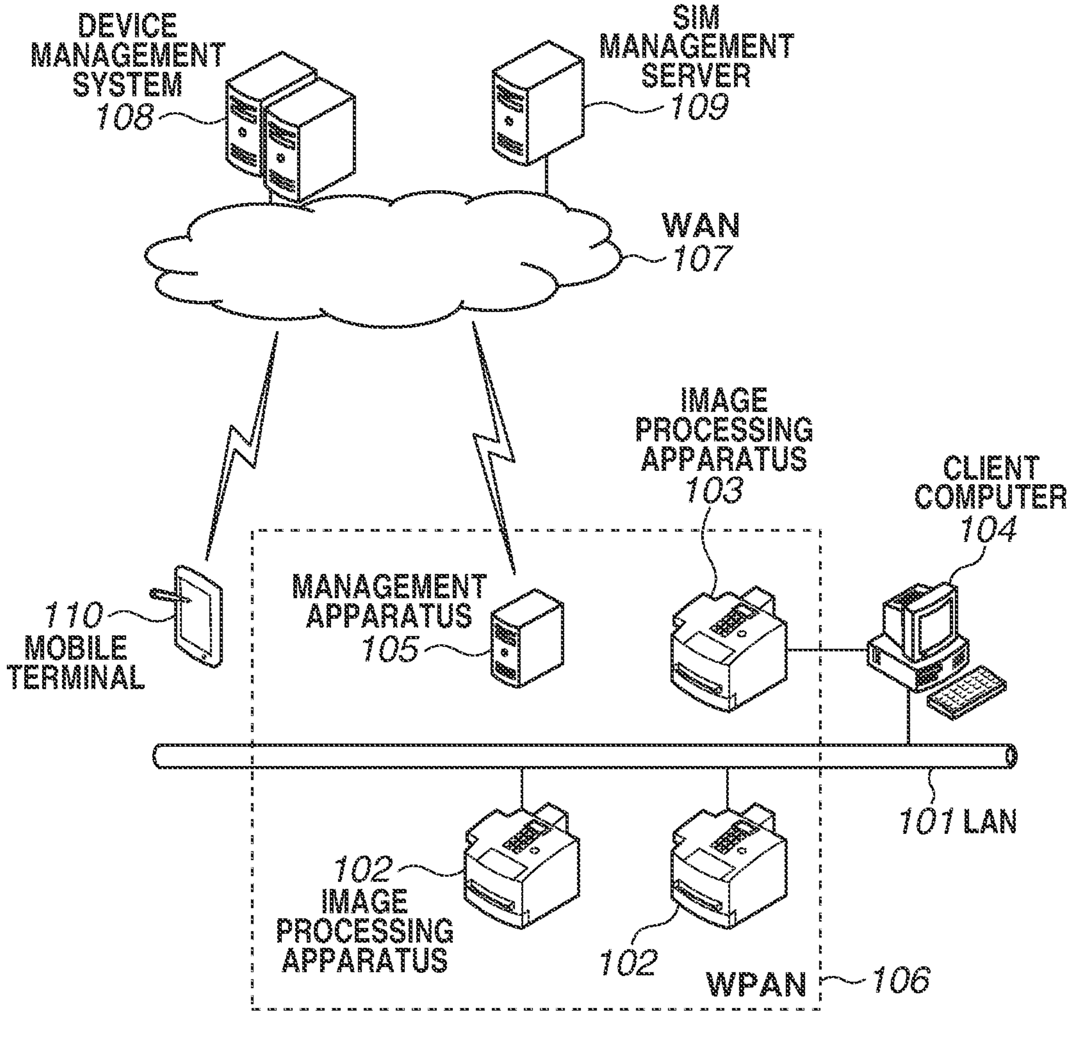

FIGS. 1A and 1B are diagrams illustrating an example of an overall configuration of the network system according to the present exemplary embodiment. FIG. 1A is a diagram illustrating a customer environment in which a plurality of image processing apparatuses serving as network devices is disposed before the present exemplary embodiment is applied. FIG. 1B illustrates a configuration example of the entire network system including a device management system when the present exemplary embodiment is applied.

In FIG. 1A, a local area network (LAN) 101 is an example of an existing local network in the customer environment in which the image processing apparatuses are installed. Image processing apparatuses 102 are connected to the LAN 101. The image processing apparatuses 102 can provide a print processing function, a scan processing function, and a plurality of other functions according to requests from a client computer 104 connected to the same LAN 101. An image processing apparatus 103 is directly connected to and used by the client computer 104 without the intervention of the LAN 101. The image processing apparatus 103 and the client computer 104 may be directly connected by such means as a Universal Serial Bus (USB) or by other means.

The client computer 104 and the image processing apparatuses 102 in FIG. 1A can also communicate with an external services via the not-illustrated Internet according to a network policy of the customer environment. In such an environment, if a new device is connected to the LAN 101 so that the device is connected to an external service via the Internet, the device needs network initialization according to the network policy. Existing network peripheral devices in the customer environment also need a setting change.

FIG. 1B illustrates an overall configuration in which a management apparatus 105 for collecting data from the network devices and a device management system 108 for managing the data collected by the management apparatus 105 are further included in addition to the customer environment illustrated in FIG. 1A.

The management apparatus 105 can collect operation information from the image processing apparatuses 102 and 103 via the LAN 101 and the mesh network to be described below. The data to be collected from the image processing apparatuses 102 and 103 includes operation information such as log information, counter information, consumable information, and power consumption information. The operation information to be collected also includes status events such as abnormalities and failures detected in the image processing apparatuses 102 and 103.

The management apparatus 105 includes a subscriber identity module (SIM) for connecting to a mobile communication (mobile broadband) network. The management apparatus 105 can connect to a wide area network (WAN) 107 via the mobile communication network by using the SIM, and can communicate with the device management system 108 via the WAN 107. In other words, the management apparatus 105 can transmit various types of data obtained from the image processing apparatuses 102 and 103 to the device management system 108 via the mobile communication network without the intervention of a firewall or a proxy already installed in the customer environment. The SIM can connect to the mobile communication network when a SIM card is inserted. A SIM card is an integrated circuit (IC) card on which an identification (ID) number (hereinafter, referred to as a SIM ID) for identifying a subscriber of a mobile line carrier is recorded. In the present exemplary embodiment, the term SIM card is used as a general term for IC cards that contain identification information, such as a SIM ID, for using various services over a mobile communication network provided by a desired provider. Examples of such IC cards include a user identity module (UIM) card and a universal subscriber identity module (USIM) card.

The WAN 107 permits a connection to the mobile communication network according to the ID number recorded on the SIM card used in the management apparatus 105. A wireless personal area network (WPAN) 106 is a network for connecting the management apparatus 105 and the image processing apparatuses 102 and 103 to be managed by the management apparatus 105 with each other. For example, in the present exemplary embodiment, the WPAN 106 uses a mesh network using a near field wireless communication standard (the Institute of Electrical and Electronic Engineers (IEEE) 802.15.4). The WPAN 106 constructs a wireless communication network dedicated to network device management between the management apparatus 105 and the image processing apparatuses 102 and 103, thereby allowing data communication using a dedicated network.

The device management system 108 has functions of managing the management apparatus 105 and the image processing apparatuses 102 and 103 in a centralized manner, and collecting and reporting various types of data collected by the management apparatus 105.

A SIM management server 109 manages a connection state with respect to each SIM ID of the management apparatus 105. The SIM management server 109 allows an authorized user or external application to operate the state of an arbitrary SIM ID via a management screen or a web application programming interface (API). For example, the device management system 108 can activate and deactivate the SIM ID of the management apparatus 105. If the SIM ID is activated, the management apparatus 105 can connect to the WAN 107 via the mobile line. If the SIM ID is deactivated, the management apparatus 105 becomes unable to connect to the WAN 107.

A mobile terminal 110 is a portable terminal having a function of initializing a management agent to be described below which runs on the management apparatus 105. The mobile terminal 110 has a function of generating network settings of the WPAN 106 and distributing the network settings to the management apparatus 105 and the image processing apparatuses 102 and 103. Like the management apparatus 105, the mobile terminal 110 can connect to the device management system 108 via the mobile communication network. An operator who installs and manages the management apparatus 105 (hereinafter, referred to simply as an operator) distributes needed settings to the management apparatus 105 via near field radio communication (NFC) by using the mobile terminal 110. It will be understood that the operator may be allowed to distribute the settings by using a USB-based wired communication unit or other communication units.

<Internal Configuration of System>

Figure 2A:
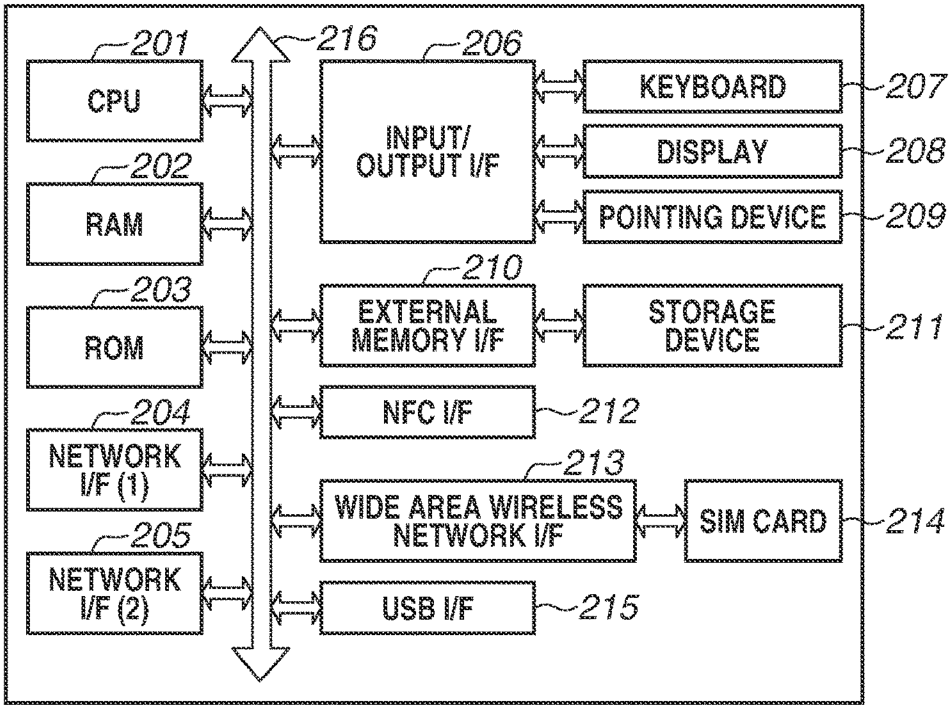
FIGS. 2A to 2C are diagrams illustrating examples of hardware configurations of apparatuses according to one or more aspects of the present disclosure.
Figure 2B:
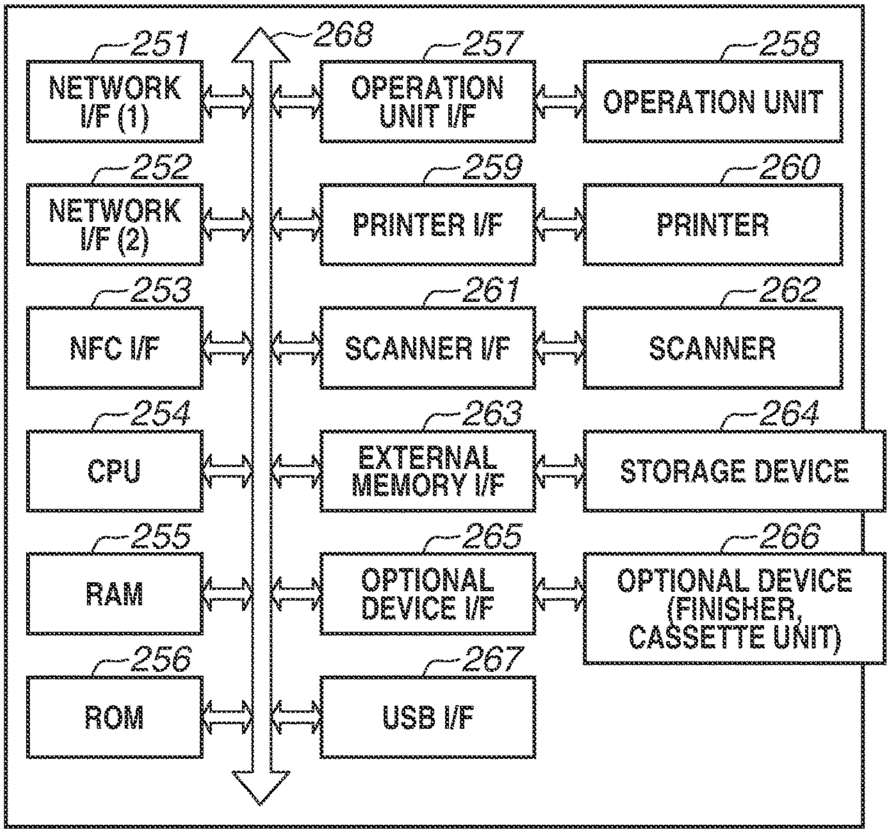
Figure 2C:
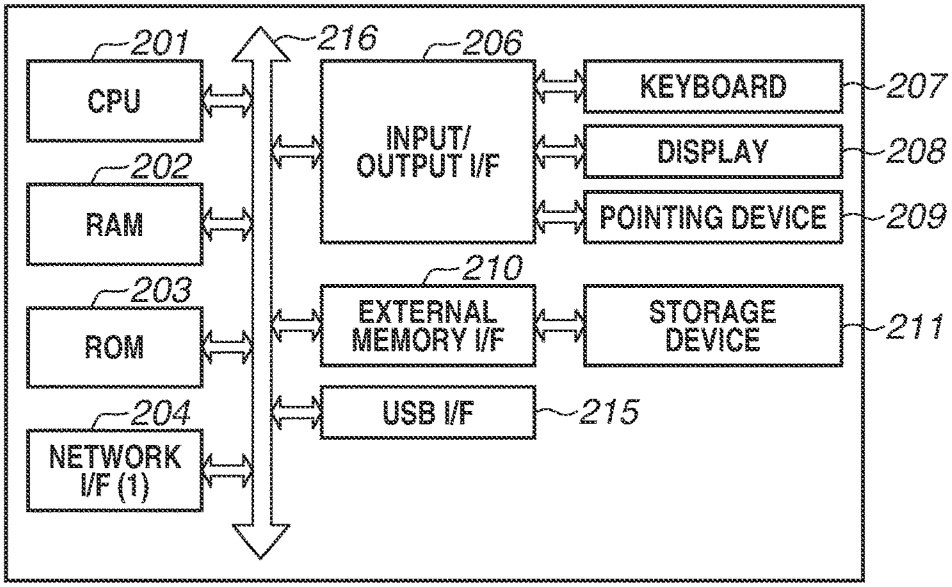

FIGS. 2A to 2C are block diagrams for describing examples of hardware configurations of the apparatuses included in FIG. 1B.

FIG. 2A is a block diagram illustrating an example of an internal configuration of the management apparatus 105 and the mobile terminal 110. In FIG. 2A, a central processing unit (CPU) 201 performs processing based on an application program stored in a read-only memory (ROM) 203 or a not-illustrated external memory. The CPU 201 further controls devices connected to a system bus 216 in a centralized manner. The CPU 201 opens various registered application windows based on commands designated by a not-illustrated mouse cursor on a display 208, and performs various types of data processing. A random access memory (RAM) 202 functions as a main memory and a work area of the CPU 201. The ROM 203 functions as a storage area of a basic input/output (I/O) program. The ROM 203 or a storage device 211 stores an operating system program (hereinafter, an operating system (OS)), which is a control program of the CPU 201, and a program for implementing processing unique to the present exemplary embodiment to be described below. The ROM 203 or the storage device 211 further stores files and various other types of data to be used during processing based on the foregoing application program.

A network interface (I/F) (1) 204 is a network I/F for connecting to a network, like a backbone network, other than the WPAN 106. The network I/F (1) 204 is an I/F for connecting with a network in which print jobs and various types of customer's communication data flow. The network I/F (1) 204 can connect to both wired and wireless networks. A network I/F (2) 205 is a network I/F different from the network I/F (1) 204. The network I/F (2) 205 can connect to the WPAN 106 such as a mesh network. The network I/F (2) 205 is an I/F for exchanging information with an external apparatus by near field wireless communication via the WPAN 106. Examples include Bluetooth (registered trademark) which is one of the near field wireless communication standards. Examples of the external apparatus include the image processing apparatuses 102 and 103 other than the own apparatus.

An input/output I/F 206 controls input from a keyboard 207 and a pointing device 209 such as a mouse, and controls output to the display 208. An external memory I/F 210 controls access to the storage device 211 such as a hard disk (HD). The storage device 211 stores a boot program, various applications, user files, and edit files.

An NFC I/F 212 controls NFC communication with an external apparatus. For example, the mobile terminal 110 can perform data communication with the management apparatus 105 via the NFC I/F 212.

A wide area wireless network I/F 213 obtains subscriber identification information (such as a SIM ID) needed for mobile communication from a SIM card 214, and establishes a connection with the WAN 107. As a mobile communication unit, the wide area wireless network I/F 213 performs communication according to mobile communication standards such as wideband code division multiple access (W-CDMA) and Long Term Evolution (LTE). It will be understood that the wide area wireless network I/F 213 may be able to connect to the WAN 107 by using other mobile communication standards. A mobile router including the wide area wireless network I/F 213 and the SIM card 214 may be externally connected to the management apparatus 105 for mobile network connection.

A USB I/F 215 controls data communication with an external apparatus via a USB connection. The system bus 216 connects the devices.

At least one of such components as the network I/F (2) 205, the wide area wireless network I/F 213, and the NFC I/F 212 may be implemented by connecting a device including the component(s) to the management apparatus 105 or the mobile terminal 110 via the USB I/F 215.

FIG. 2B is a block diagram illustrating an example of an internal configuration of the image processing apparatuses 102 and 103 which are examples of network devices. A network I/F (1) 251 and a network I/F (2) 252 in the image processing apparatuses 102 and 103 have a similar configuration to that of the foregoing network I/Fs (1) and (2) 204 and 205, respectively. A description thereof will thus be omitted.

An NFC I/F 253 controls NFC communication with an external apparatus. For example, the mobile terminal 110 can perform data communication with the image processing apparatuses 102 and 103 via the NFC I/Fs 253.

A CPU 254 outputs an image signal serving as output information to a printer 260 via a printer I/F 259 connected to a system bus 269, based on a control program. The control program is stored in a ROM 256 or a storage device 264. The image processing apparatuses 102 and 103 are capable of performing communication processing with external apparatuses via the network I/F (1) 251 and the network I/F (2) 252. For example, either one of the network I/Fs (1) and (2) 251 and 252 is configured to be used in notifying the management apparatus 105 of information inside the image processing apparatus 102 or 103. The CPU 254 further performs processing based on an application program stored in the ROM 256 or the storage device 264. A RAM 255 functions as a main memory and a work area of the CPU 254. The RAM 255 is configured so that its memory capacity can be extended by an optional RAM connected to a not-illustrated extension port. The RAM 255 is used as an output information loading area, an environment data storage area, and a non-volatile RAM (NVRAM). An example of the storage device 264 is an HD. A control program and an application program of the CPU 254, font data to be used in generating the foregoing output information, and information used on the image processing apparatus 102 or 103 are stored in the ROM 256 or the storage device 264. When an application is installed on the image processing apparatus 102 or 103, the application is temporarily stored in the RAM 255 or the storage device 264. An operation unit I/F 257 controls an interface with an operation unit 258, and outputs image data to be displayed to the operation unit 258. The operation unit I/F 257 also receives information input by the user via the operation unit 258. The operation unit 258 corresponds to an operation panel on which an operation switch and a light-emitting diode (LED) indicator are arranged.

A printer I/F 259 outputs the image signal serving as the output information to the printer 260 (printer engine). A scanner I/F 261 receives an image signal serving as input information from a scanner 262 (scanner engine).

An external memory I/F 263 (memory controller) controls access to an HD and an external memory such as an IC card. The number of external memories is not limited to one, and at least one or more external memories may be included. The external memory I/F 263 may be configured so that, in addition to built-in fonts, a plurality of optional font cards and/or external memories containing programs for interpreting printer control languages of different language systems can be connected to the external memory I/F 263. A not-illustrated NVRAM may be included to store printer mode setting information from the operation unit 258.

In addition to the foregoing control program, identification information for identifying the image processing apparatus 102 or 103, the network settings, and operation information to be collected by the management apparatus 105 are also stored in the storage device 264.

An optional device I/F 265 controls access to an optional device 266 such as a finisher and a cassette unit. Aside from a finisher and a cassette unit, the optional device 266 may be a peripheral device for extending the functions and mechanism of an MFP. Examples of such a peripheral device include a camera and an IC card reader. A USB I/F 267 controls data communication with an external device by USB connection. For example, the USB I/F 267 is USB-connected to the client computer 104 to be described below. The client computer 104 can perform various print operations and scan operations via the USB I/F 267. A system bus 268 connects the devices.

At least one of such components as the network I/F (2) 252 and the NFC I/F 253 may be implemented by connecting a device including the component(s) to the image processing apparatus 102 or 103 via the USB I/F 267.

Network devices to which the present exemplary embodiment can be applied aside from the image processing apparatuses 102 and 103 are configured, for example, by replacing the printer 260 and/or the scanner 262 with pieces of hardware (such as a camera and a special sensor) unique to the functions to be provided by the network devices.

FIG. 2C is a block diagram illustrating an example of an internal configuration of the client computer 104, the device management system 108, and the SIM management server 109. A CPU 201, a RAM 202, a ROM 203, a network I/F (1) 204, an input/output I/F 206, a keyboard 207, a display 208, a pointing device 209, an external memory I/F 210, a storage device 211, a USB I/F 215, and a system bus 216 in FIG. 2C are similar to those of FIG. 2A. A description thereof will thus be omitted. The device management system 108 may be provided by using a plurality of virtual machines implemented by one or more apparatuses like the one illustrated in FIG. 2C.

<Functional Configuration of System>

FIGS. 3A to 3E are diagrams illustrating examples of software module configurations (functions) of the apparatuses included in the present exemplary embodiment. The functions described below are implemented by executing programs by the CPUs of the respective apparatuses.

Figure 3A:
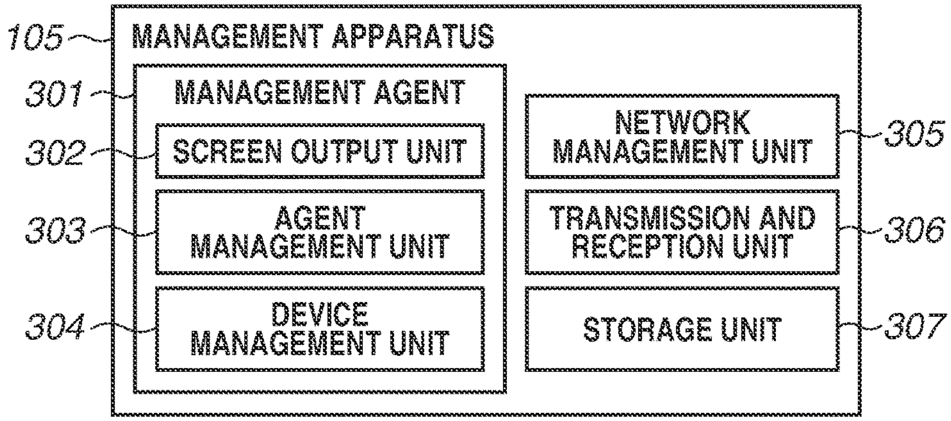
FIGS. 3A to 3E are diagrams illustrating examples of software module configurations of the apparatuses according to one or more aspects of the present disclosure.

FIG. 3A is a diagram illustrating a functional configuration of the management apparatus 105.

A management agent 301 is a function provided by an application program that the management apparatus 105 executes to manage the image processing apparatuses 102 and 103. The management agent 301 includes a screen output unit 302, an agent management unit 303, and a device management unit 304. The screen output unit 302 outputs a web user interface (UI) screen for operating the management agent 301. The agent management unit 303 manages various settings of the management agent 301 itself. For example, the agent management unit 303 manages a setting of identification information (agent identifier or agent ID) for identifying the management agent 301, which is assigned to each management agent 301, a setting to enable or disable search processing for the image processing apparatuses 102 and 103, and a setting to enable or disable data acquisition processing. The agent management unit 303 further manages settings such as a type of operation information to be collected and a collection schedule.

The device management unit 304 searches for devices on the WPAN 106, and collects various types of data from the image processing apparatuses 102 and 103 to be monitored based on the search result. The devices to be searched for are registered in advance by using individual identification information and models of the devices. The device management unit 304 performs control to transmit the collected data to the device management system 108 according to a reserved schedule. The data to be transmitted to the device management system 108 may be the operation information collected from the image processing apparatuses 102 and 103. The collected operation information may be simply transmitted along with the identification information about the image processing apparatuses 102 and 103. Processing such as filtering of unneeded data and addition of needed data may be applied to the data before transmission. A network management unit 305 changes network settings of the management apparatus 105 according to a request from a transmission and reception unit 306 or the screen output unit 302.

The transmission and reception unit 306 transmits and receives data between various functions of the management apparatus 105 and an external apparatus via the network I/F (1) 204, the network I/F (2) 205, the NFC I/F 212, and the wide area wireless network I/F 213. Setting change processing is performed on various network I/Fs mentioned above according to network settings received via the transmission and reception unit 306. A storage unit 307 stores various types of data in the storage device 211 according to requests from other functions.

Figure 3B:
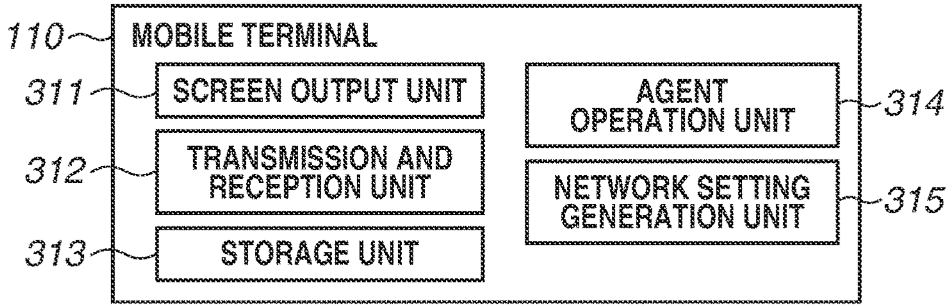

FIG. 3B is a diagram illustrating a functional configuration of the mobile terminal 110.

A screen output unit 311 displays a screen on the display 208 of the mobile terminal 110. A transmission and reception unit 312 transmits and receives data via the transmission and reception unit 306 of the management apparatus 105 and transmission and reception units 321 of the image processing apparatuses 102 and 103 to be described below according to the operator's operation. A storage unit 313 stores various types of data in the storage device 211.

An agent operation unit 314 transmits a command to the management agent 301 of the management apparatus 105 according to the operator's operation instructions accepted by the screen output unit 311. Examples of the command include commands to perform installation processing of the management agent 301, assignment processing of the agent ID, processing for starting and stopping a search for the image processing apparatuses 102 and 103, and processing for starting and stopping data acquisition from the image processing apparatuses 102 and 103. It will be understood that other commands related to management of the management agent 301 and the image processing apparatuses 102 and 103 may be transmitted.

A network setting generation unit 315 generates the network settings of the mesh network which is an example of the WPAN 106. The information included in the network settings includes setting value information about the settings of the mesh network, such as a mesh group ID and channel (frequency band) information used in the mesh network. It will be understood that other setting values for constructing and managing a mesh network may be included. An identifier (attribute information) for identifying the mesh network, such as "personal area network (PAN) ID" defined in IEEE 802.15.4, is used as the mesh group ID. The mesh group ID is used so that a desired management apparatus 105 and network devices, such as the image processing apparatuses 102 and 103, can belong to the same group. A network device in which mesh network settings are enabled can communicate, via the mesh network, with only network devices in which the same mesh group ID is set, and not with ones in which a different mesh group ID is set. Setting values other than the unique identifier such as the mesh group ID may be generated according to a previously defined template. The operator may be allowed to set the setting values via the screen output unit 311.

Figure 3C:
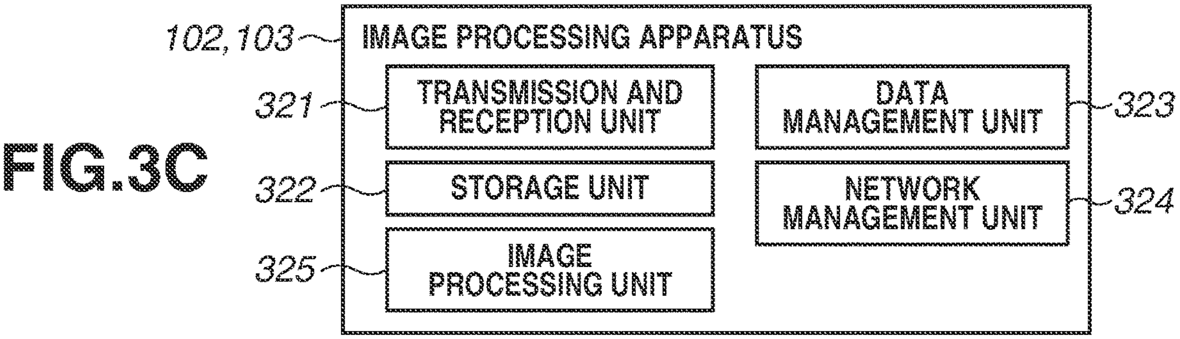

FIG. 3C is a diagram illustrating a functional configuration of the image processing apparatuses 102 and 103.

A transmission and reception unit 321 controls transmission and reception of data via the network I/F (1) 251, the network I/F (2) 252, and the NFC I/F 253. A storage unit 322 stores various types of data including operation information into the storage device 264 according to requests from other functions. A data management unit 323 obtains operation information such as an operation history of the operation unit 258 of the image processing apparatus 102 or 103, an operation history of the printer 260 and the scanner 262, various types of counter information, and a status of the image processing apparatus 102 or 103, and manages the operation information in the storage device 264. The data management unit 323 transmits the foregoing various types of operation information to outside via the transmission and reception unit 321 according to a request from an external apparatus such as the management apparatus 105. A network management unit 324 manages a change of the network settings of the image processing apparatus 102 or 103. An image processing unit 325 controls image processing using the printer 260 and the scanner 262 according to input of instructions from the operation unit 258 and via a network.

Figure 3D:
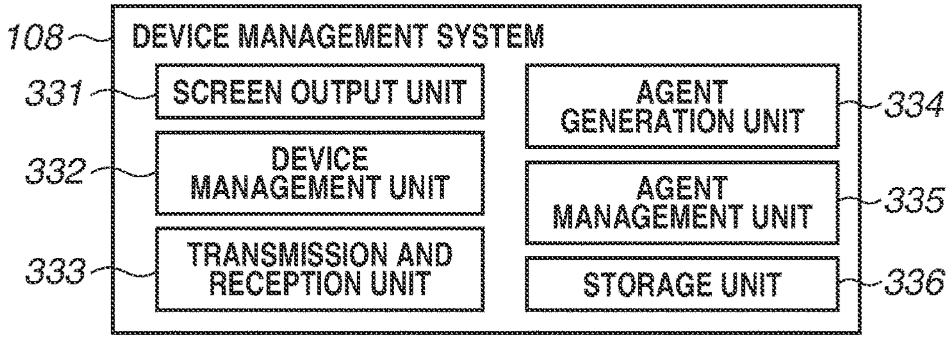

FIG. 3D is a diagram illustrating a functional configuration of the device management system 108.

A screen output unit 331 provides a web UI for the system administrator and the operator to operate the device management system 108. A device management unit 332 manages information (identification information and operation information) about the network devices to be managed by the device management system 108. In particular, the device management unit 332 manages the operation information about the image processing apparatuses 102 and 103, received from the management apparatus 105.

A storage unit 336 stores data such as the operation information received from the management apparatus 105, and registration information about the devices, input from the web UI, into the storage device 211. The device management unit 332 summarizes the stored operation information to output a report of the operation statuses of the image processing apparatuses 102 and 103 via the screen output unit 331 or via a file. The storage unit 336 stores the data received from the management apparatus 105 with respect to each customer (tenant) registered in the device management system 108. The device management unit 332 manages and processes the data tenant by tenant. A transmission and reception unit 333 controls transmission and reception of data via the network I/F (1) 204.

An agent generation unit 334 generates an installer of the management agent 301 (application program) for a general-purpose personal computer (PC) to function as the management apparatus 105 according to the operator's request. For example, the installer may be generated by transmitting installer data previously stored in the storage unit 336 to the request source via the transmission and reception unit 333. Binary data of the installer may be generated in real time according to an acquisition request for the installer. An agent ID for uniquely identifying the management agent 301 is set in the installer. This allows the device management system 108 to manage the agent ID, identification information (tenant ID) about the customer to which the installer is provided, and device IDs of network devices in the customer environment in association with each other.

An agent management unit 335 manages the management agent 301 running on the management apparatus 105 set up in each tenant. For example, the agent management unit 335 performs processing for issuing an agent ID to be included in the installer and processing for issuing commands to the management agent 301 according to requests from the system administrator or the operator. Examples of the processing for issuing commands to the management agent 301 include processing for starting and stopping a search for devices on the network to which the management apparatus 105 belongs, and processing for starting and stopping data acquisition. Such commands are executed on the management agent 301 via the transmission and reception unit 333 and the transmission and reception unit 306. The storage unit 336 stores various types of data to be used by the device management unit 332 and the agent management unit 335. The storage unit 336 adds, reads, updates, and deletes records to/from/in various data tables illustrated in Tables 1 to 3 according to requests from other functions.

Tables 1 to 3 illustrate various data tables to be edited by the storage unit 336.

TABLE 1

| Tenant Management Table<br>Tenant ID |
|---|
| TN001 |
| TN002 |
| TN003 |
| . . . |

Table 1 is a tenant management table. Table 1 includes a column for storing tenant IDs which are identification information for uniquely identifying customers. A tenant ID is a unit for securely separating resources when a web service provided by the device management system 108 is used by various organizations and individuals. Such a system is typically referred to as a multi-tenant system.

TABLE 2

User Management Table

| Tenant ID | User ID | Mail Address | Password | Authority |
|---|---|---|---|---|
| TN001 | U001@TN001 | aaa@bbb.com | ********* | Tenant administrator |
| TN001 | U001@TN002 | xxx@yyy.com | ********* | Management apparatus installation operator |
| TN001 | U001@TN003 | xxx@ggg.com | ********* | General user |
| . . . | . . . | . . . | . . . | . . . |

Table 2 is a user management table. Table 2 includes a column for storing the tenant IDs of the tenants to which users belong. Table 2 includes columns for storing user IDs which are identification information about the users, mail addresses of the users, and passwords, respectively. Table 2 includes a column for storing authorities given in the tenants to which the users belong. Suppose here that possible authorities include a tenant administrator who is authorized for all data in a tenant, a management apparatus installation operator who is authorized for management agent operations for the installation of the management apparatus 105, and a general user who has only a limited authority.

TABLE 3

Agent Management Table

| Agent ID | Tenant ID | SIM ID |
|---|---|---|
| AG10001 | TN001 | 440-10-123456789 |
| AG10002 | TN002 | — |
| AG10003 | TN003 | 440-10-104912371 |
| . . . | . . . | . . . |

Table 3 is an agent management table. Table 3 includes columns for storing agent IDs, tenant IDs to which the agent IDs belong, and SIM IDs of the agent IDs, respectively. The SIM IDs are unique SIM identifiers retained in the SIM cards 214 connected to the management apparatuses 105 to which the agent IDs are assigned.

Figure 3E:
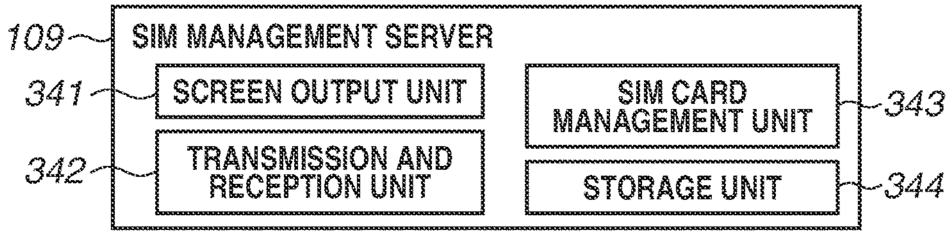

FIG. 3E is a diagram illustrating a functional configuration of the SIM management server 109.

A screen output unit 341 provides a web UI for the system administrator to operate SIMs. A transmission and reception unit 342 controls transmission and reception of data via the network I/F (1) 204.

A SIM card management unit 343 provides a web API for an external apparatus or external application having an access authority to operate the state of an arbitrary SIM via the transmission and reception unit 342. For example, the device management system 108 can operate a line status of a SIM used in the management apparatus 105 to perform an operation such as activation or deactivation. The activation and deactivation of a SIM refer to opening and closing the mobile line. The device management system 108 controls the SIM of the management apparatus 105 via the SIM management server 109. This enables opening a mobile line on-demand, with the effect of not only cost reduction but also prevention of unauthorized access when a SIM theft occurs. A storage unit 344 stores the IDs of the SIMs managed by the SIM card management unit 343, and state information and attribute information about various SIMs.

<Mesh Network Construction Processing Between Management Apparatus and Image Processing Apparatuses According to Present Exemplary Embodiment>

A processing flow in which the operator operates the mobile terminal 110 to construct the dedicated WPAN 106 between the management apparatus 105 and the image processing apparatuses 102 and 103 will be described below with reference to FIGS. 4A and 4B. The following description deals with processing for constructing a mesh network which is an example of the WPAN 106 as described above.

Figure 4A:
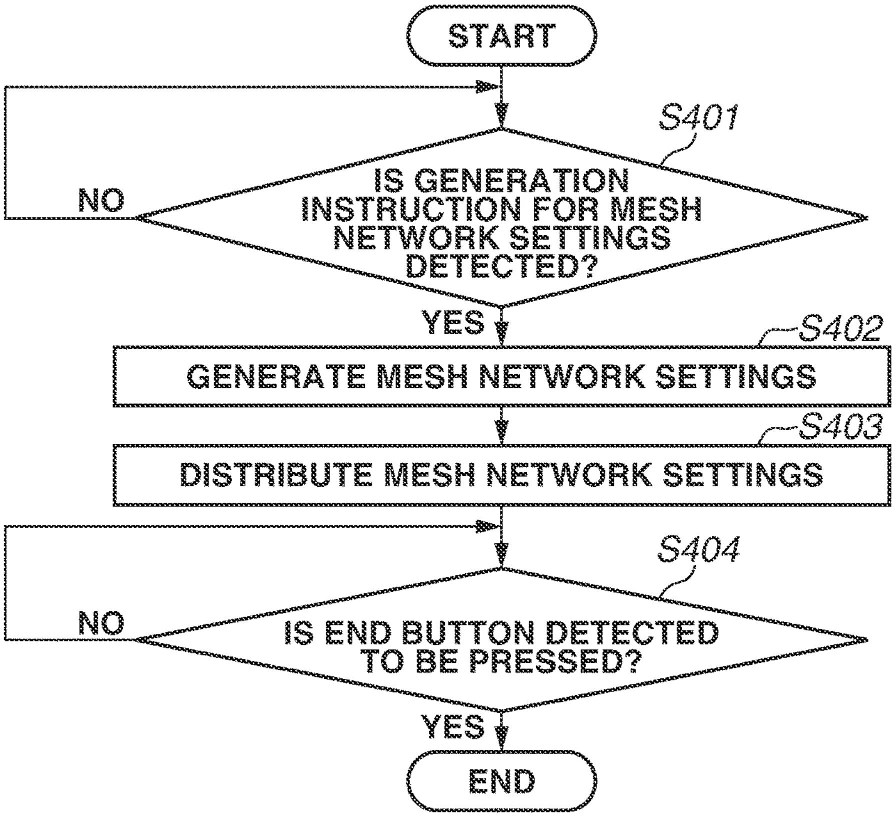
FIGS. 4A and 4B are flowcharts for describing processing for constructing a mesh network according to one or more aspects of the present disclosure.

FIG. 4A is a flowchart for describing processing in which the mobile terminal 110 of the operator distributes the settings of the mesh network. A program related to the present processing is executed by the CPU 201.

In step S401, the mobile terminal 110 determines whether a generation instruction for the network settings of the mesh network (mesh network settings) from the operator is detected. If a generation instruction for the network settings is detected (YES in step S401), the processing proceeds to step S402. The generation instruction here is given according to the operator's activation instruction for a dedicated application installed on the mobile terminal 110. The mobile terminal 110 may connect to a web service UI of the device management system 108, and the dedicated application may be activated as an applet provided by the web service UI. In such a case, an example of the program that the mobile terminal 110 executes for the present processing here may be an application that also operates as a web browser.

In step S402, the network setting generation unit 315 generates the network settings of the mesh network. The setting values of the mesh network settings other than unique identifiers such as a mesh group ID are generated according to a previously defined template.

Figure 7:
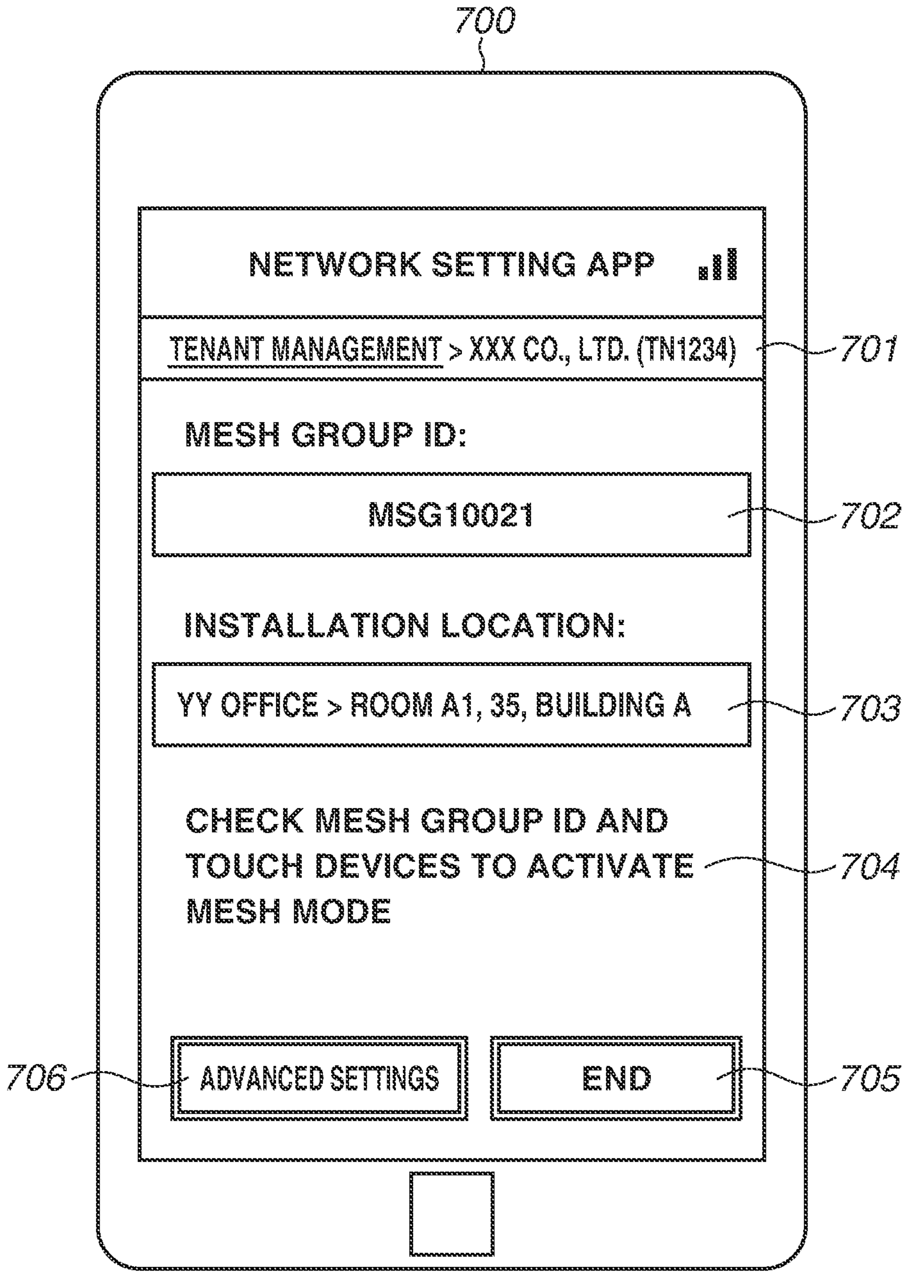
FIG. 7 is a diagram illustrating an example of a screen of a mobile terminal for distribution of network settings according to one or more aspects of the present disclosure.

FIG. 7 illustrates an example of a screen provided via the screen output unit 331 of the mobile terminal 110, intended for distribution of the mesh network settings.

The mobile terminal 110 will also be represented by the reference numeral 700. The mobile terminal 700 displays a standby screen in a state where the mesh network settings can be distributed. A section 701 displays which tenant the distribution operation of the mesh network settings is performed in. An edit section 702 is intended for a mesh group ID of the mesh network settings. The mesh group ID may be automatically generated at random and displayed as a default by the network setting generation unit 315. The operator may be allowed to set the mesh group ID. An installation location input section 703 is a section to which a value for identifying the installation location of the management apparatus 105 and the image processing apparatuses 102 and 103 can be input. The operator can edit the value for each device to which the network settings are distributed. The value input to the installation location input section 703 is applied as a setting value of the image processing apparatuses 102 and 103. A message display section 704 displays a message for notifying the operator of information about the distribution of the mesh network settings. Here, a message that the network settings can be distributed via the NFC I/Fs 212 and 253 by touching (contacting) the target devices with the mobile terminal 110 is displayed to the operator. A button 706 is intended to display a screen for confirming and editing the setting values of the network settings other than the mesh group ID and the installation location. An end button 705 is intended to end the distribution processing of the mesh network settings.

In step S403, the transmission and reception unit 312 of the mobile terminal 110 distributes the mesh network settings to the target devices to join the mesh network. In the present exemplary embodiment, the operator successively touches the management apparatus 105 and the image processing apparatuses 102 and 103 with the mobile terminal 110 on which the screen illustrated in FIG. 7 is opened. By the touch operations, the mesh network settings are distributed to the devices via the NFC I/Fs 212 and 253. The distribution operation may be carried out via the USB I/Fs 215 and 267.

In step S404, if the end button 705 is detected to be pressed by the operator according to completion of the distribution of the mesh network settings to the management apparatus 105 and the image processing apparatuses 102 and 103 (YES in step S404), the distribution of the mesh network settings is considered to be ended. The present processing ends.

Figure 4B:
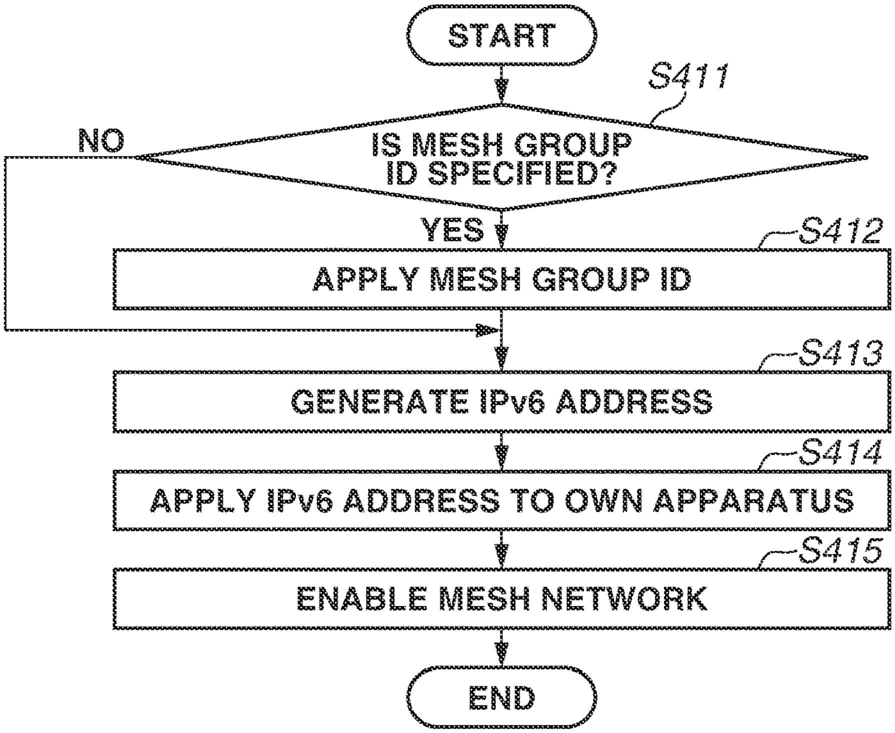

FIG. 4B is a flowchart for describing processing for constructing a mesh network, in each of the management apparatus 105 and the image processing apparatuses 102 and 103. Programs for implementing the present processing by the network management units 305 and 324 of the apparatuses are executed by the CPUs 201 and 254. The present processing is performed by any of the network management units 305 and 324 having received the mesh network settings from the mobile terminal 110. In the following description of the present processing, the agent of the processing will be referred to simply as a network management unit, with the reference numerals omitted.

In step S411, the network management unit determines whether a mesh group ID is specified as a received mesh network setting. In the present exemplary embodiment, to exclude the possibility of unspecified devices to join the mesh network, a mesh group ID is expected to be specified. If a mesh group ID is specified (YES in step S411), the processing proceeds to step S412. If a mesh group ID is not specified (NO in step S411), the processing proceeds to step S413. In step S412, the network management unit performs processing for applying the mesh group ID as information for identifying the mesh network to join.

In step S413, the network management unit generates an Internet Protocol version 6 (IPv6) address needed to use the mesh network. Here, the IPv6 address is generated from a media access control (MAC) address. An example of a method for generating the IPv6 address is stateless address autoconfiguration. In step S414, the network management unit applies the IPv6 address generated in step S413 to the own apparatus.

In step S415, the network management unit enables the mesh network of the own apparatus and joins the mesh network.

Based on the processing illustrated in FIGS. 4A and 4B, the network management unit performs authentication processing and negotiations with a router device in the mesh network according to the mesh network settings. The management apparatus 105 and the image processing apparatuses 102 and 103 can thus join the same mesh network. In such a manner, the mesh network serving as the WPAN 106, in which the management apparatus 105 collects operation information, can be constructed.

The processing up to the construction of the mesh network and processing in which the management apparatus 105 collects operation information by using the mesh network after the construction do not need to use the existing network (LAN 101) in the customer environment. The network settings of the image processing apparatuses 102 and 103 about the existing network therefore do not need to be changed accordingly.

The mesh network settings to be distributed from the mobile terminal 110 may be generated on the device management system 108 and transmitted to the mobile terminal 110.

<Processing Flow Up to Installation of Management Apparatus>

A processing flow in which the operator installs the management apparatus 105 in the customer environment will be described below with reference to FIGS. 5A to 5C.

Figure 5A:
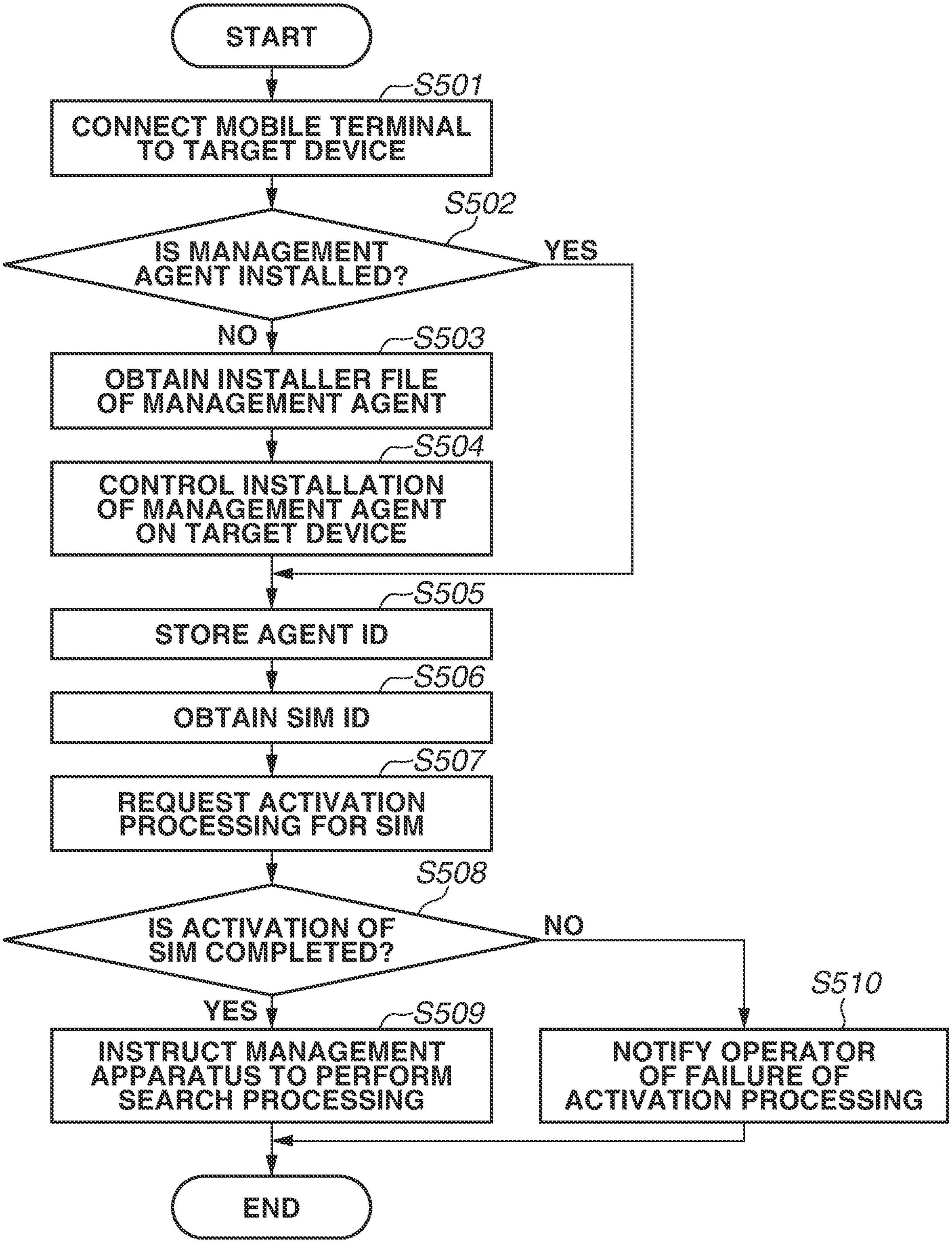
FIGS. 5A to 5C are flowcharts for describing a processing flow up to installation of a management apparatus according to one or more aspects of the present disclosure.

FIG. 5A is a flowchart for describing processing on the mobile terminal 110 of the operator. A program related to the present processing is executed by the CPU 201.

In step S501, the operator connects the mobile terminal 110 to a device (target device) to run the management agent 301 on. The mobile terminal 110 may be connected to the target device by such means as Bluetooth-based wireless connection and USB-based wired connection. The target device may be a device that is brought to the customer environment by the operator or a PC that already exists in the customer environment.

In step S502, the agent operation unit 314 determines whether the management agent 301 is already installed on the target device. If the management agent 301 is determined to be installed (YES in step S502), the processing proceeds to step S505. If the management agent 301 is determined to not be installed (NO in step S502), the processing proceeds to step S503.

If the target device as the management apparatus 105 is one that is brought to the customer environment by the operator, the target device can be brought in with the management agent 301 installed in advance. The target device to be brought in may be one on which the management agent 301 is already installed and that can be USB-powered from a network device, such as an image processing apparatus, from which operation information is to be collected. An example of such a target device is a small-sized single-board computer. This computer may have a configuration such that the keyboard 207, the display 208, and the pointing device 209 are omitted from the configuration illustrated in FIG. 2A. A management apparatus having such a configuration may be built in a network device from which operation information is to be collected, by utilizing part of the hardware configuration of the network device.

In step S503, the agent operation unit 314 requests and obtains an installer file of the management agent 301 from the device management system 108. In step S504, the agent operation unit 314 transfers the installer file of the management agent 301 to the target device. The agent operation unit 314 then issues an execution instruction for the installer, and the management agent 301 is installed on the target device. By the processing so far, the target device is installed as the management apparatus 105.

In step S505, the agent operation unit 314 stores the agent ID of the management agent 301 installed on the management apparatus 105.

In step S506, the agent operation unit 314 obtains the SIM ID of the SIM card 214 included in the management apparatus 105. In step S507, the agent operation unit 314 specifies the agent ID and the obtained SIM ID and requests the device management system 108 to perform activation processing for the SIM. The activation processing of the SIM in the device management system 108 (FIG. 5B) will be described below.

In step S508, based on a response from the device management system 108, the agent operation unit 314 determines whether the activation of the SIM is completed or has failed. If the activation of the SIM is successful and the processing is completed (YES in step S508), the processing proceeds to step S509. If the activation has failed (NO in step S508), the processing proceeds to step S510.

In step S509, the agent operation unit 314 instructs the management apparatus 105 to perform processing for searching the mesh network for devices from which operation information is to be collected. In step S510, the agent operation unit 314 notifies the operator of the failure of the activation processing via the screen output unit 311.

Figure 5B:
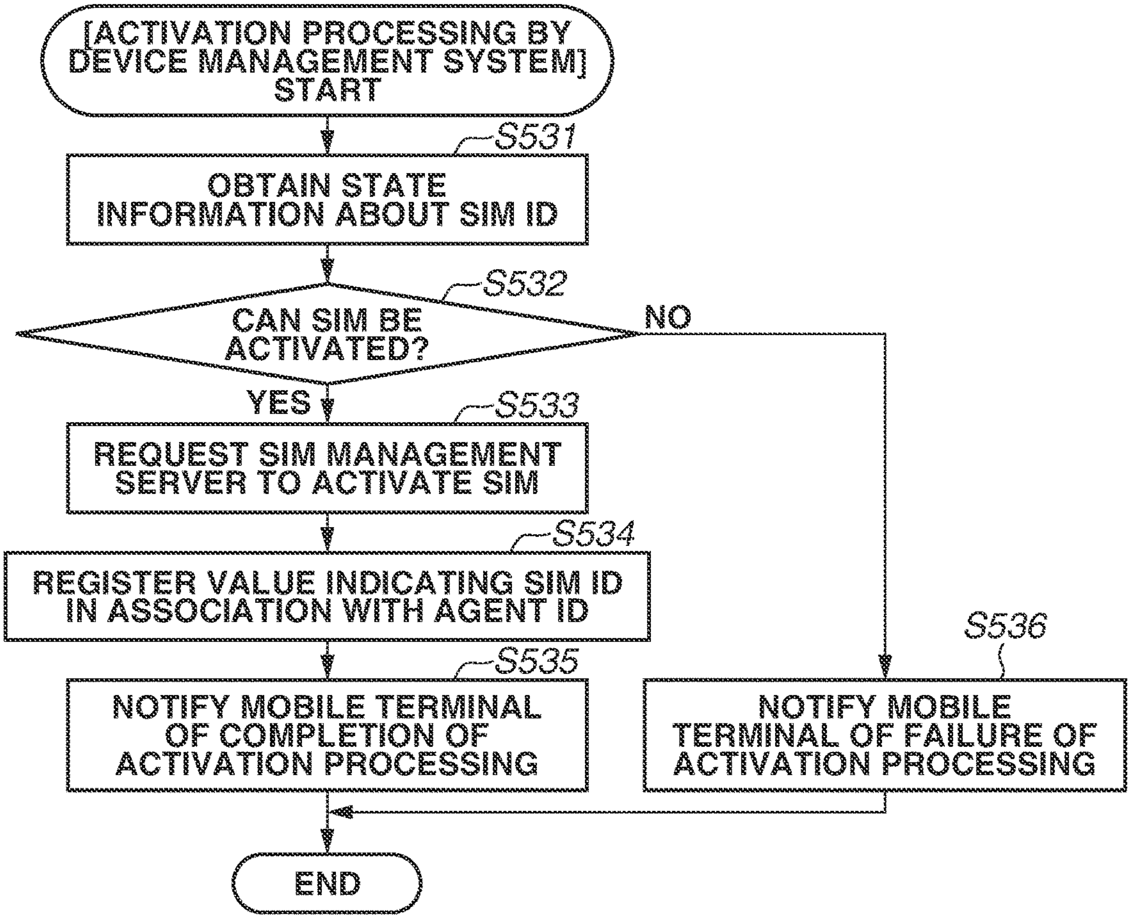

FIG. 5B is a flowchart for describing the processing for activating the SIM of the management apparatus 105 by the device management system 108. A program related to the present processing is executed by the CPU 201. The present processing is started according to reception of an activation request for the SIM from the mobile terminal 110.

In step S531, the agent operation unit 314 connects to the SIM management server 109 and obtains state information about the SIM ID included in the activation request. In step S532, based on the state information about the SIM ID, the agent operation unit 314 determines whether the SIM can be activated. If the SIM is determined to be able to be activated (YES in step S532), the processing proceeds to step S533. If the SIM is determined to not be able to be activated (NO in step S532), the processing proceeds to step S536. Whether the SIM can be activated is determined, for example, in such a manner that if the SIM (communication setting thereof) corresponding to the SIM ID is deactivated, the SIM is determined to be able to be activated. If the SIM (communication setting thereof) corresponding to the SIM ID is already activated or if there is no SIM ID itself, the SIM is determined to not be able to be activated.

In step S533, the agent management unit 335 connects to the SIM management server 109 and requests the activation of the SIM (communication setting thereof) corresponding to the SIM ID. The SIM card management unit 343 of the SIM management server 109 performs the activation processing of the SIM in response to the request. This enables the management apparatus 105 to communicate with the device management system 108 via the WAN 107.

In step S534, the agent management unit 335 registers an additional value indicating the SIM ID in the agent management table illustrated in Table 3 in association with the agent ID included in the activation request.

In step S535, the agent management unit 335 notifies the mobile terminal 110 of the completion of the activation processing of the SIM.

In step S536, the agent management unit 335 notifies the mobile terminal 110 of the failure of the activation processing of the SIM. The present processing ends.

Figure 5C:
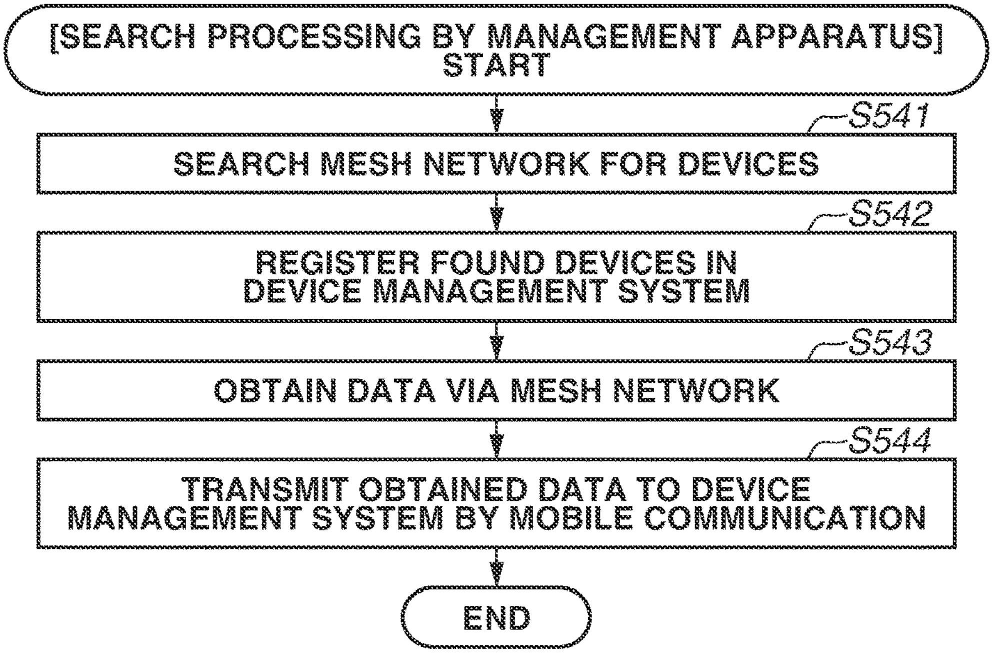

FIG. 5C is a flowchart for describing the search processing by the management apparatus 105. A program related to the present processing is executed by the CPU 201. The present processing is started according to the request for the search processing in the foregoing step S509 from the mobile terminal 110.

In step S541, the device management unit 304 connects to the mesh network and searches the mesh network for devices. The image processing apparatuses 102 and 103 are found here. The image processing apparatuses 102 and 103 may be searched for by such means as performing broadcast communication on the mesh network. Alternatively, the image processing apparatuses 102 and 103 in the mesh network may be searched for by other means.

In step S542, the device management unit 304 transmits device information about the found devices to the device management system 108 via the WAN 107 by mobile communication using the wide area wireless network I/F 213. Based on the device information, the device management system 108 can register the devices to be monitored by the management agent 301 of the management apparatus 105. The device information may include identification information such as the serial numbers and MAC addresses of the devices, model information, address information, and vendor information indicating the manufacturers. The information about the registered devices (image processing apparatuses 102 and 103) can be checked from a management screen provided by the device management system 108.

In step S543, the device management unit 304 connects to the image processing apparatuses 102 and 103 via the mesh network, and obtains data including operation information. In step S544, the device management unit 304 transmits the data obtained from the image processing apparatuses 102 and 103 in step S543 to the device management system 108 via the WAN 107 by mobile communication using the wide area wireless network I/F 213.

The device management unit 304 subsequently repeats the collection processing of the operation information via the mesh network in step S543 and the transmission processing of the collected data using the mobile communication network (mobile network) in step S544 according to schedules and other conditions.

<Removal Operation of Management Agent>

In the present exemplary embodiment, the management agent 301 is run in the customer environment to transmit the operation information collected by the mesh network to the device management system 108 via the mobile network which is enabled by SIM cards. This reduces operations such as the initialization of the management agent 301 to fit to the existing network in the customer environment, and the management apparatus 105 on which the management agent 301 runs can be easily introduced into the customer environment. This facilitates temporary installation of the management agent 301 and introduction of the management apparatus 105 for the purpose of customer assessment of the services provided by the device management system 108. Now, processing for removing the management agent 301 from the customer environment will be described in view of temporary introduction.

Processing of the apparatuses related to the removal operation of the management agent 301 will be described below with reference to the flowcharts of FIGS. 6A and 6B.

Figures 6A, 6B:
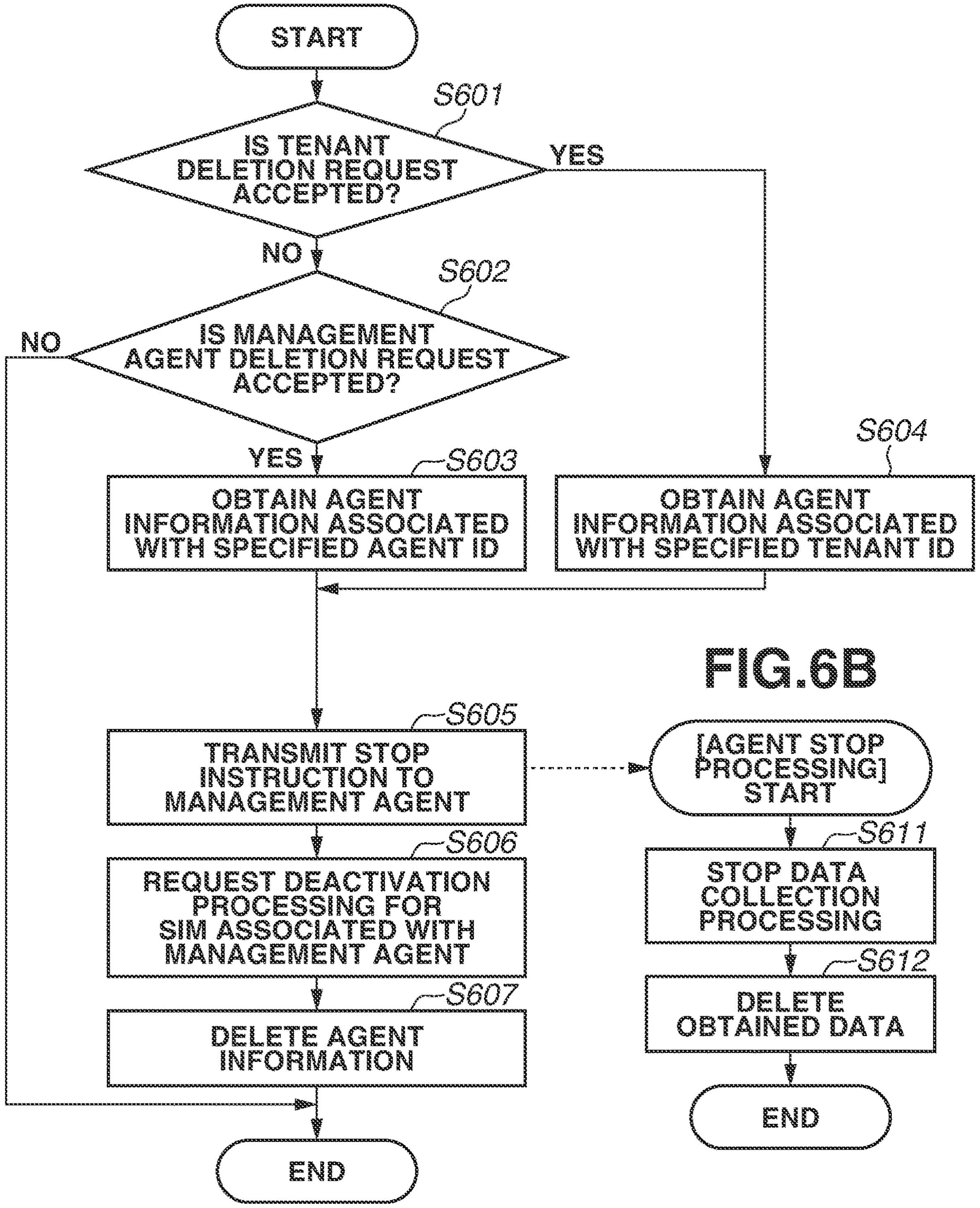
FIGS. 6A and 6B are flowcharts for describing a removal operation of a management agent according to one or more aspects of the present disclosure.

FIG. 6A is a flowchart for describing processing for deleting the management agent 301 by the device management system 108. A program related to the present processing is executed by the CPU 201. The present processing is started according to the operator's input via the web UI (management screen) provided by the screen output unit 331 of the device management system 108.

In step S601, the agent management unit 335 determines whether a tenant deletion request is accepted from the operator via the management screen provided by the screen output unit 331. If a tenant deletion request is not accepted (NO in step S601), the processing proceeds to step S602. If a tenant deletion request is determined to be accepted (YES in step S601), the processing proceeds to step S604.

In step S602, the agent management unit 335 determines whether a management agent deletion request is accepted from the operator via the management screen provided by the screen output unit 331. If a management agent deletion request is determined to be accepted (YES in step S602), the processing proceeds to step S603. If a management agent deletion request is not accepted (NO in step S602), the present processing ends.

In step S603, the agent management unit 335 obtains, from the agent management table, agent information associated with an agent ID specified by the deletion request in step S602. The agent information includes the agent ID, a tenant ID, and a SIM ID.

In step S604, the agent management unit 335 obtains, from the agent management table, agent information (an agent ID and a SIM ID) associated with a tenant ID specified by the deletion request in step S601. The agent information includes the agent ID, the tenant ID and the SIM ID.

In step S605, the agent management unit 335 transmits a stop instruction to the management agent 301 of the management apparatus 105 corresponding to the agent ID included in the agent information obtained in step S603 or S604. Details of the processing by the management agent 301 based on the stop instruction will be described below with reference to FIG. 6B.

In step S606, the agent management unit 335 connects to the SIM card management unit 343 of the SIM management server 109, and requests deactivation processing for the SIM by specifying the SIM ID included in the agent information obtained in step S603 or S604. In step S607, the agent management unit 335 deletes the agent information obtained in step S603 or S604 from the agent management table.

FIG. 6B is a flowchart for describing the processing of the management apparatus 105 having received the stop instruction for the management agent 301, given in step S605.

In step S611, the device management unit 304 stops data collection processing for collecting data from the image processing apparatuses 102 and 103, and deletes subsequent schedules of the data collection processing. In step S612, the device management unit 304 deletes various types of data obtained from the image processing apparatuses 102 and 103, stored in the storage unit 307. At this timing, the device management unit 304 may uninstall the management agent 301 itself.

As described above, according to the present exemplary embodiment, the management apparatus 105 constructs a mesh network with the image processing apparatuses 102 and 103. In the mesh network, the management apparatus 105 obtains various types of data from the image processing apparatuses 102 and 103. The obtained data is transmitted to the device management system 108 via a mobile line which is opened according to need. The management agent 301 can be easily stopped from a remote location by inputting a management agent deletion request to the management screen provided by the device management system 108. The management apparatus 105 can thus be easily introduced and operated without many changes to the customer environment.

In the first exemplary embodiment, the mesh network settings generated by the mobile terminal 110 are distributed to the management apparatus 105 and the image processing apparatuses 102 and 103 to construct a mesh network. However, if a new management target is added after a start of operation of the network system, the network settings of the mesh network may no longer exist in the mobile terminal 110. In such a case, various values of the mesh network settings need to be manually input again. In a second exemplary embodiment, a mechanism for registering the network settings generated by the mobile terminal 110 in the device management system 108 in association with the agent ID in view of reuse of the mesh network settings will be described. The system configuration is the same as that in the first exemplary embodiment. A description thereof will thus be omitted.

<Processing Flow Up to Installation of Management Apparatus in Present Exemplary Embodiment>

Figures 8A, 8B:
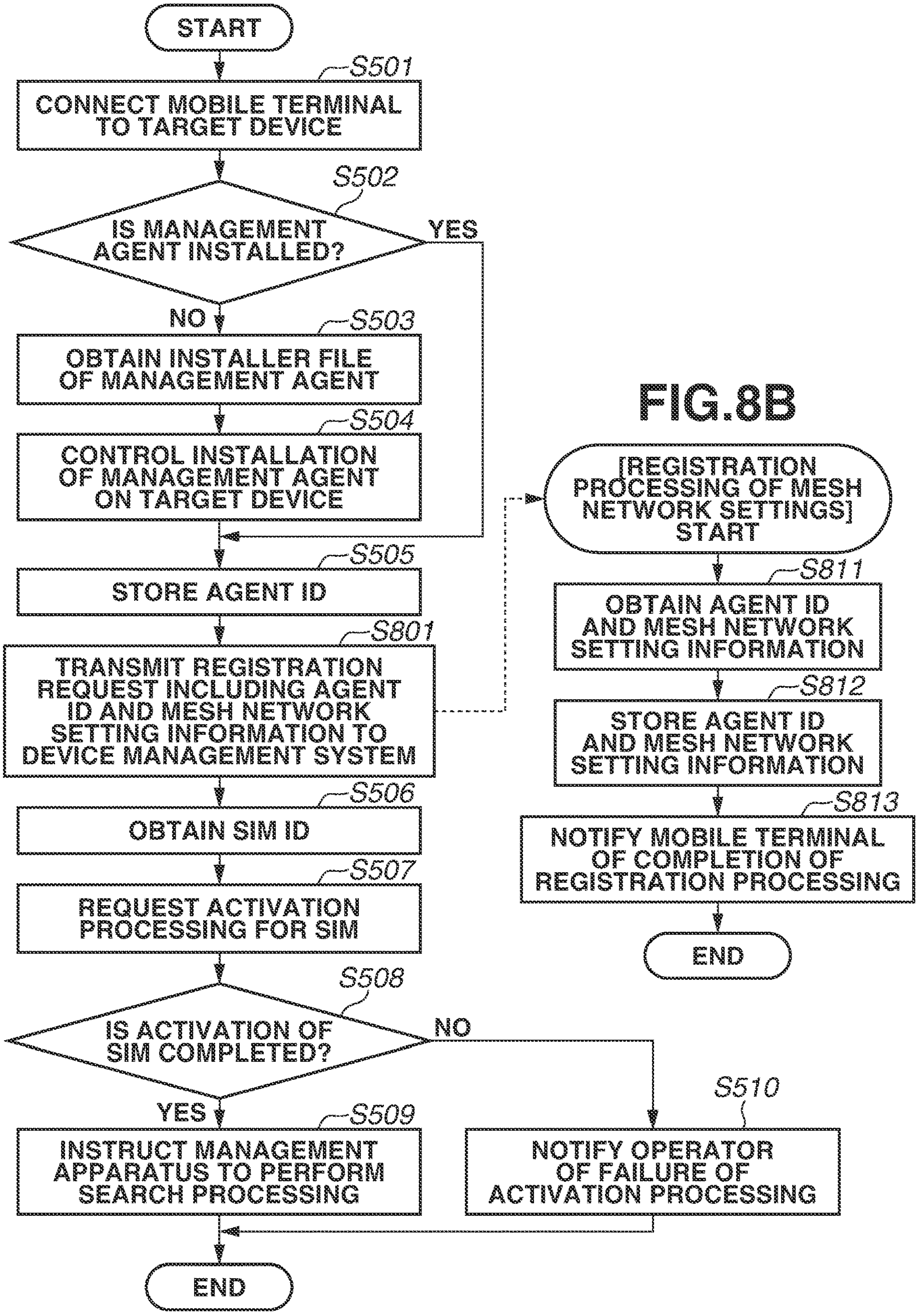
FIGS. 8A and 8B are flowcharts for describing a processing flow up to the installation of the management apparatus according to one or more aspects of the present disclosure.

FIGS. 8A and 8B illustrate an improvement of the processing described in FIG. 5A according to the foregoing first exemplary embodiment. Processing similar to that of the first exemplary embodiment is designated by the same step numbers. A description thereof will be omitted.

FIG. 8A is a flowchart of the mobile terminal 110. FIG. 8A illustrates an improvement of the flowchart of FIG. 5A, to which the processing of step S801 is added.

In step S801, the agent operation unit 314 of the mobile terminal 110 obtains the mesh network settings (mesh network setting information) applied in step S403 from the network management unit 305 of the management apparatus 105. The mesh network setting information may include installation location information about the management apparatus 105. The agent operation unit 314 transmits a registration request including the agent ID stored in step S505 and the mesh network setting information to the device management system 108.

FIG. 8B is a flowchart for describing registration processing of the mesh network settings in the device management system 108. The present processing is started when the registration request for the mesh network settings is received from the mobile terminal 110.

In step S811, the agent management unit 335 of the device management system 108 obtains the agent ID and the mesh network setting information included in the registration request received from the mobile terminal 110. In step S812, the storage unit 336 stores an additional record including the agent ID and the mesh network setting information into a mesh network setting management table (Table 4).

TABLE 4

Mesh Network Setting Management Table

| Agent ID | Installation Location | Mesh Group ID | Mesh Network Setting Value Group |
|---|---|---|---|
| AG10001 | YY Office > Room A1, 35, Building A | MSG10021 | Default Profile 1 |
| AG10002 | XX Branch > C3, 4F, ZZ Building | MSG10234 | Custom Profile 1 |
| . . . | . . . | . . . | . . . |

Table 4 is the mesh network setting management table. The mesh network setting management table is defined to include columns in which the values of agent IDs, installation locations of management apparatuses, mesh group IDs, and mesh network setting value groups are stored, respectively.

In step S813, the agent management unit 335 notifies the mobile terminal 110 of completion of the registration processing of the mesh network setting information.

<Processing for Applying Mesh Network Settings to Additional Device>

Figure 9:
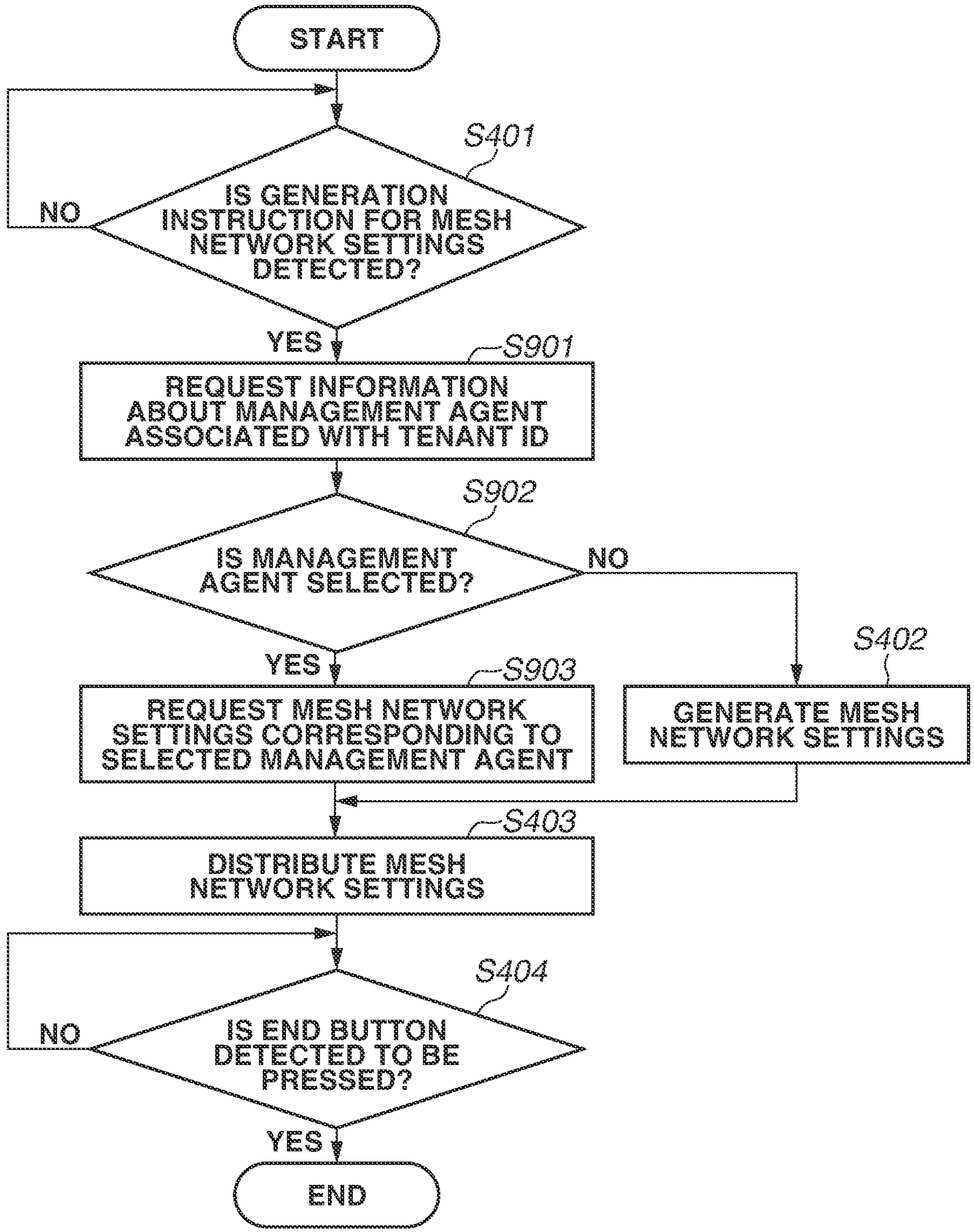
FIG. 9 is a flowchart for describing processing for applying mesh network settings to an additional device according to one or more aspects of the present disclosure.

FIG. 9 illustrates an improvement of the processing illustrated in FIG. 4A according to the foregoing first exemplary embodiment. Processing similar to that of the first exemplary embodiment is designated by the same step numbers. A description thereof will be omitted.

In step S901, the agent operation unit 314 of the mobile terminal 110 requests, from the device management system 108, information about the management agent 301 associated with the tenant ID corresponding to the installation environment of a target device to be added. The device management system 108 obtains the agent information corresponding to the tenant ID specified by the request from the agent management table, and transmits the agent information to the mobile terminal 110. Based on the obtained agent information, the agent operation unit 314 then presents a list of management agents 301 running in the installation environment to the operator via the screen output unit 311. If there is only one management agent 301, the only one management agent 301 is listed. Information indicating the installation locations of the management apparatuses 105 on which the respective management agents 301 run may also be presented here. The operator can specify whether to select a management agent 301 to collect the operation information about the additional target device or construct a new mesh network.

In step S902, the agent operation unit 314 determines whether any one of the management agents 301 is selected by the operator via the screen output unit 311. If any one of the management agents 301 is determined to be selected (YES in step S902), the processing proceeds to step S903. If no management agent 301 is selected (NO in step S902), the processing proceeds to step S402.

In step S903, the agent operation unit 314 specifies the agent ID of the management agent selected in step S902 and requests the corresponding mesh network settings from the device management system 108. The device management system 108 obtains the corresponding mesh network settings from the mesh network setting management table, and transmits the mesh network settings to the mobile terminal 110.

In step S403, the mobile terminal 110 distributes the mesh network settings obtained in step S402 or S903 to the additional device.

The first and second exemplary embodiments have dealt with the construction of the WPAN 106 (mesh network) for collecting the operation information about the network devices. In fact, the network to which the management apparatus 105 is connected may be switched from the mesh network to the existing network (LAN 101) of the customer environment due to reasons such as the customer's internal control management and a change from service assessment of the device management system 108 to a main contract. In a third exemplary embodiment, processing related to the switching of networks to which the management apparatus 105 is connected will be described.

<Processing for Switching Networks by Management Apparatus>

Figure 10:
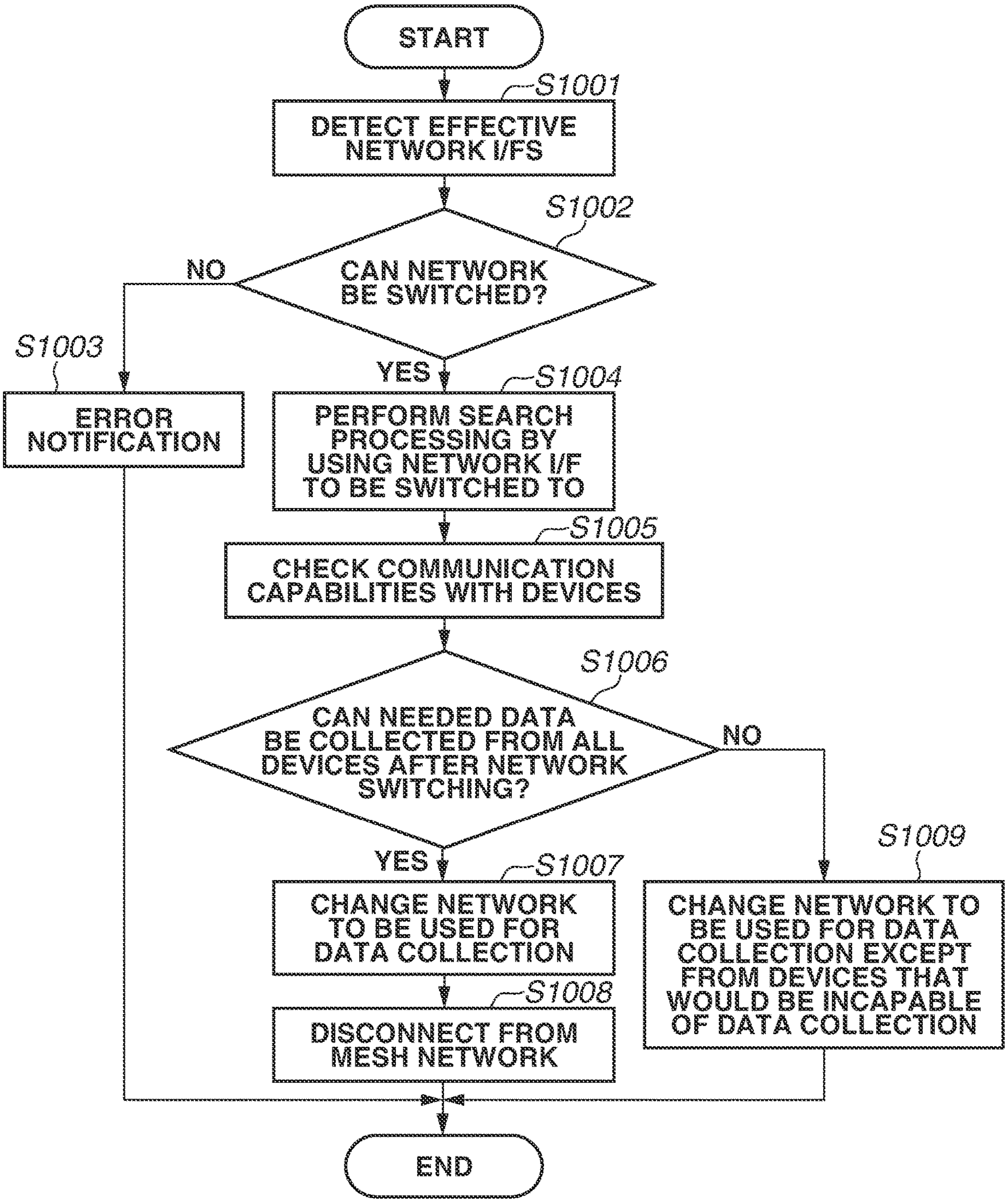
FIG. 10 is a flowchart for describing network switch processing of the management apparatus according to one or more aspects of the present disclosure.

Processing for switching the network in which the management apparatus 105 collects operation information from the network devices from the mesh network to another network (for example, LAN 101) will be described with reference to the flowchart illustrated in FIG. 10. A program related to the present processing is executed by the CPU 201. The present processing is started according to the operator's input to the management agent 301 via the web UI (management screen) provided by the management apparatus 105 or the device management system 108.

In step S1001, the agent management unit 303 detects effective network I/Fs in the management apparatus 105. The effective network I/Fs refer to ones that can connect to the LAN 101, such as the network I/F (1) 204 and the network I/F (2) 205 of FIG. 2A.

In step S1002, the agent management unit 303 determines, according to the detection result of effective network I/Fs in step S1001, whether the network can be switched. If no effective network I/F is detected (NO in step S1002), the agent management unit 303 determines that the network is unable to be switched, and the processing proceeds to step S1003. In step S1003, the agent management unit 303 notifies the web UI to which the input is made by the operator of an error. The present processing ends. If the network can be switched (YES in step S1002), the processing proceeds to step S1004. If a plurality of effective network I/Fs is detected, the operator may be allowed to select one.

In step S1004, the agent management unit 303 performs the search processing for network devices on the LAN 101 by using the network I/F to be switched to. Before this processing, the agent management unit 303 may obtain needed information, including network settings for connecting to the LAN 101 (proxy settings and parameters related to the network policy) and address information about the devices (image processing apparatuses 102) on the LAN 101, from the device management system 108 via the mobile line. The device management system 108 manages various types of setting information, such as the network settings for using the LAN 101, in association with the tenant ID of the customer environment. The search processing can be implemented by a search using broadcast of a search packet or unicast to a predetermined range, or by a search by specifying the address information about the network devices from which operation information is to be collected.

In step S1005, to determine whether various types of needed data (such as operation information) can be obtained from the image processing apparatuses 102 found by the search processing, the device management unit 304 attempts an acquisition request for various types of data to check communication capabilities.

In step S1006, the agent management unit 303 determines, based on the results of steps S1004 and S1005, whether the needed data can be collected from all the target devices after the mesh network is switched to the other network. If the needed data can be collected from all the target devices (YES in step S1006), the processing proceeds to step S1007. If not (NO in step S1006), the processing proceeds to step S1009.

Specific cases in which the processing proceeds from step S1006 to step S1009 will be described.

Case 1: A network device from which operation information has been collected on the mesh network is not found by the search processing of step S1004. Examples of such a network device include one that is not directly connected to the LAN 101, like the image processing apparatus 103 in FIG. 1B. A network device that does not process a broadcast packet may also fail to be found.

Case 2: There is a network device from which the data needed to be collected is unable to be collected in step S1005. Examples of such a network device include one not supporting the protocol for collection.

In step S1007, the device management unit 304 changes the settings of the own apparatus so that the data collection from the image processing apparatuses 102 is switched from data collection via the mesh network to data collection via the LAN 101 using the network I/F detected in step S1001. In step S1008, the agent management unit 303 disconnects the connection with the mesh network via the network management unit 305. The agent management unit 303 may delete the setting values related to the network settings of the mesh network identified by the mesh group ID used so far. The network management unit 305 may specify the own agent ID and transmit a request to delete the mesh network settings to the device management system 108 via the mobile line.

In step S1009, the device management unit 304 changes the settings of the own apparatus so that the data collection from the image processing apparatuses 102 other than the device(s) not capable of data collection after the switching of the network, identified in step S1006, is switched from data collection via the mesh network to data collection via the LAN 101 using the network I/F detected in step S1001. For the device(s) not capable of data collection after the switching of the network, identified in step S1006, the previous data collection via the mesh network is continued.

In the present exemplary embodiment, the method for switching the collection path of the operation information from the mesh network to another network when a predetermined condition is satisfied has been described.

In the first to third exemplary embodiments, the data collected from the network devices by the management apparatus 105 is transmitted to the device management system 108 via the mobile line. If the management apparatus 105 can connect to the LAN 101 during such system operation, the management apparatus 105 may connect to the WAN 107 via the LAN 101 and transmit the collected data to the device management system 108.

Such a change may be made according to the operator's instruction via the web UI (management screen) provided by the management apparatus 105 or the device management system 108. In such a case, the device management system 108 may distribute the network settings, including proxy settings for the management apparatus 105 to perform communication with the WAN 107 from the LAN 101 and address information such as a Uniform Resource Locator (URL) of the device management system 108, to the management apparatus 105 via the mobile line.

According to the completion of the change, the device management system 108 may specify the SIM ID of the management apparatus 105 and request the SIM management server 109 to perform the deactivation processing for the SIM.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-027292, filed Feb. 16, 2017, which is hereby incorporated by reference herein in its entirety.

What is claimed is:

1. A system comprising:

a management apparatus configured to perform wireless communication and a device management system, wherein the management apparatus operating as a management agent for managing one or more network devices comprises:

a card containing second identification information for using a mobile network;

a memory storing instructions related to the management agent; and a processor which is capable of executing the instructions causing the management apparatus to:

join a mesh network, wherein the mesh network uses a near field wireless communication, identified by first identification information distributed by a mobile terminal;

perform a search of the mesh network for a network device;

obtain operation information from the network device found by the search via the mesh network, wherein the operation information includes information recorded by the network device based on execution of one or more requests from a local network existing in advance in an environment in which the network device is installed; and transmit the obtained operation information to the device management system via the mobile network by using the card, wherein the device management system manages the operation information which is obtained by the management apparatus via the mesh network and is received from the management apparatus via the mobile network, and wherein the local network, the mesh network, and the mobile network are different networks.

2. The system according to claim 1, wherein the search is performed according to an instruction from an external apparatus in response to activation processing for using the mobile network.

3. The system according to claim 1, wherein device identification information about the network device found by the search is transmitted to the device management system via the mobile network.

4. The system according to claim 1, wherein if a plurality of network devices is found by the search, operation information about at least one of the plurality of network devices is obtained via the mesh network, the at least one of the plurality of network devices satisfying a predetermined condition, and operation information about network device(s) other than the at least one of the plurality of network devices satisfying the predetermined condition is obtained via the local network.

5. The system according to claim 4, wherein the at least one of the plurality of network devices, satisfying the predetermined condition, is a device not directly connected to the local network, and wherein operation information about the device not directly connected to the local network is obtained via the mesh network.

6. The system according to claim 4, wherein a network setting for using the local network is obtained from the device management system via the mobile network.

7. The system according to claim 1, wherein the network device is at least one of an image processing apparatus, a three-dimensional (3D) printer, a network camera, and a digital medical instrument.

8. A method for a management system that includes a device management system and a management apparatus that executes a management agent for managing one or more network devices and that is configured to perform wireless communication and a card containing second identification information for using a mobile network, the method comprising:

joining, by a management apparatus, a mesh network, wherein the mesh network uses a near field wireless communication, identified by first identification information distributed by a mobile terminal;

performing, by the management apparatus, a search of the mesh network for a network device;

obtaining, by the management apparatus, operation information from the network device found by the search via the mesh network, wherein the operation information includes information recorded by the network device based on execution of one or more requests from a local network existing in advance in an environment in which the network device is installed;

transmitting, by the management apparatus, the obtained operation information to a device management system via the mobile network by using the card; and managing, by the device management system, the operation information which is obtained by the management apparatus via the mesh network and is received from the management apparatus via the mobile network, wherein the local network, the mesh network, and the mobile network are different networks.

9. The system according to claim 1, wherein, by the device management system, the second identification information included in the card is managed in association with the management apparatus, and wherein connection to the mobile network by the card is restricted in response to execution of deactivation processing using the second identification information by the device management system.

10. The system according to claim 1, wherein the device management system comprises a storage for storing third identification information of the management agent and environmental information related to an environment, in which the management apparatus operating as the management agent is installed, in association with the first identification information, and wherein, in a case where another network device is added as a management target of the management agent, the first identification information managed in association with the third identification information corresponding to the environmental information is received by the mobile terminal from the device management system and is distributed, by using the mobile terminal, to the another network device as mesh network settings.

11. The system according to claim 1, wherein the network device is an image processing apparatus having at least one of a printer and a scanner, wherein a function related to at least one of the printer and the scanner is provided according to one or more requests from the local network, and wherein the operation information includes history information related to at least one of the printer and the scanner.

* * * * *